June 14, 1927.
A. HUBERTY
LAWN TRIMMER
Filed June 2, 1925
1,632,479
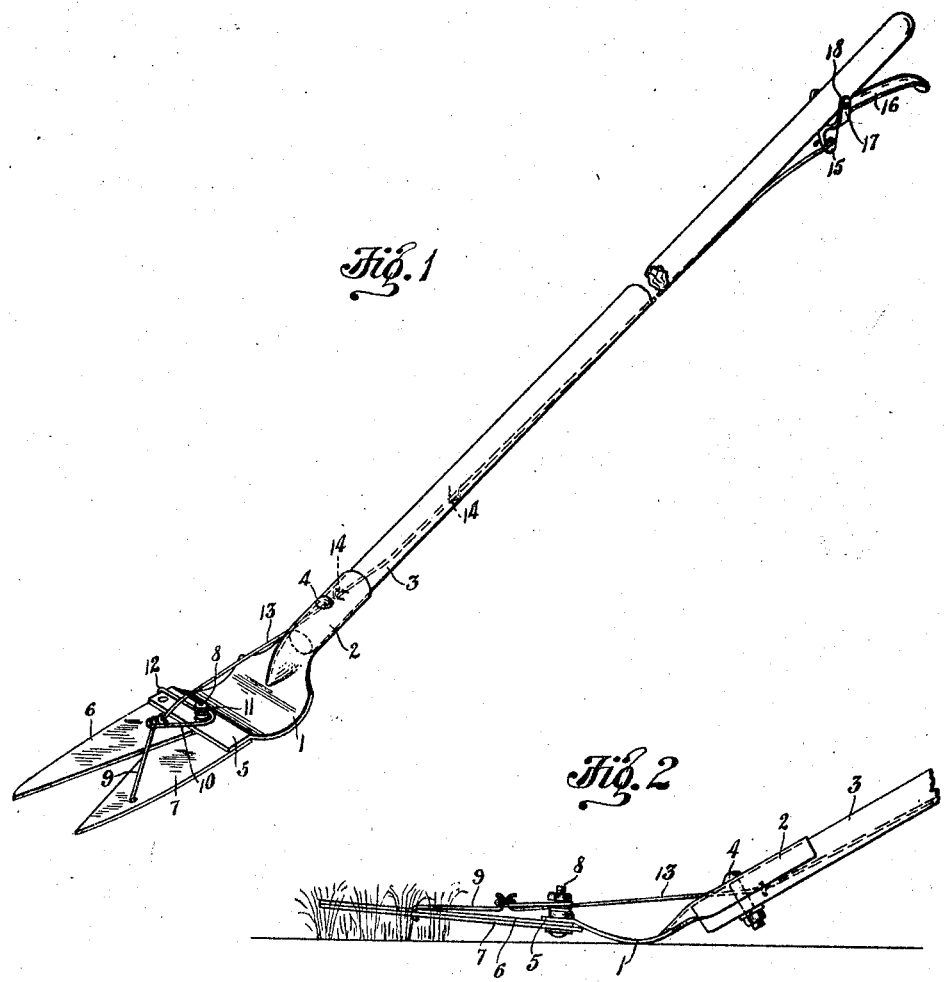
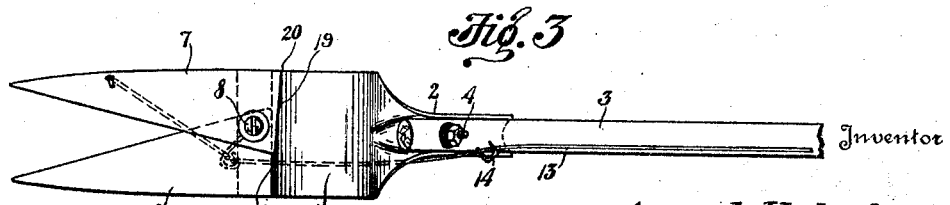
Inventor
August Huberty Patented June 14, 1927.

1,632,479

UNITED STATES PATENT OFFICE.

AUGUST HUBERTY, OF CANTON, OHIO.

LAWN TRIMMER.

Application filed June 2, 1925. Serial No. 34,326.

This invention relates to a trimmer or clipper for trimming lawns adjacent to curbings, walls, plants, trees or shrubbery, or other places where an ordinary lawn mower cannot be used for the purpose of trimming.

The objects of the improvement are to provide a simple and inexpensive device which is light in weight and easily handled and which is capable of being manipulated with one hand to trim grass or weeds around the edge of a lawn or close to objects, and in other places inaccessible to the ordinary lawn mower.

The above and other objects may be attained by providing a curved shoe connected to the lower end of a straight handle, and having a shear blade fixed thereon and a movable shear blade pivoted thereto and co-operating with the fixed shear blade, a spring being provided for normally holding the blades in open position, and a flexible wire controlling the pivoted blade and leading to an operating lever upon the upper end of the handle in position to be gripped by the operator.

An embodiment of the invention is illustrated in the accompanying drawing, in which, Figure 1, is a perspective view of the improved lawn trimmer;

Fig. 2, an enlarged side elevation of the same in operative position, the upper portion of the handle being broken away, and, Fig. 3, a bottom plan view of the same.

Similar numerals of reference indicate corresponding parts throughout the drawing.

The improved trimmer includes a curved shoe 1 formed of sheet metal and having the angular channel portion 2 rigidly connected to the lower end of the handle 3 as by a bolt 4. The forward end of the shoe is provided with the angular flange 5 to which is rigidly connected a triangular shear blade 6, preferably formed separately from the shoe and detachably connected thereto in order that the blade may be replaced when worn.

The movable shear blade 7, which may be similar in shape to the fixed blade, is pivoted at its rear end, near its cutting edge, as by the bolt or screw 8 to the corresponding portion of the fixed blade and to the flange 5 of the shoe.

A link 9 connects the pivoted blade with the end of the spring arm 10 of a spring which may be coiled around the bolt 8 as shown at 11, the other end thereof being connected to one side of the flange 5 as shown at 12. The spring arm 10 is thus normally in position to hold the shear blades in open position as shown in Figures 1 and 3.

For the purpose of operating the movable shear blade 7 a wire or other flexible member 13 is connected to the joint between the spring arm 10 and the link 9, and extends through suitable guides 14 along the handle 3 to the rocker arm 15 of the operating lever 16, the bifurcated portion 17 of which is pivoted as at 18 to the upper end portion of the handle.

The rear edge 19 of the pivoted shear blade is so proportioned that when the blade is in the open position the outer rear corner 20 of the blade will contact with the curved portion of the shoe 1, as shown in Fig. 3, limiting the opening movement of the blade to a position whereby the link 9 will not over-lie the cutting edges of the shear blades. When the blades are in closed position the inner rear corner 21 of the pivoted blade will in a like manner contact with the curved portion of the shoe 1, limiting the closing movement thereof.

In manipulating the trimmer to cut the grass at the edge of a lawn or around any object, the curved shoe is slidably moved along the ground in the position substantially as shown in Fig. 2, and the hand lever 16 is operated rapidly which in co-operation with the spring arm 10 causes a rapid opening and closing movement of the shear blades, clipping the grass as the trimmer is moved forward over the same. It will be seen that by rocking the trimmer forward or rearward upon the curved shoe, the height at which the grass is trimmed may be regulated.

I claim:

1. A lawn trimmer including a shoe, a handle connected to the rear end of the shoe, a fixed shear blade upon the forward end of the shoe, a movable shear blade pivotally connected to the forward end of the shoe and cooperating with the fixed blade, a link connected at one end to the free end portion of the pivoted blade, a spring arm directly connected at its free end to the other end of the link for normally holding the pivoted blade in open position and means directly connected to the spring arm for operating said link to close the pivoted blade.

2. A lawn trimmer including a shoe for engagement with the surface of a lawn, a handle connected to the rear end of the shoe, a fixed shear blade upon the forward end of the shoe, a movable shear blade pivotally conected to the forward end of the shoe and cooperating with the fixed blade, a link connected at one end to the forward end portion of the pivoted blade, a spring arm directly connected at its free end to the other end of said link and means upon the handle, connected to said spring arm, for manipulating the movable shear blade.

3. A lawn trimmer including a shoe for engagement with the surface of a lawn, a handle connected to the rear end of the shoe, a fixed shear blade upon the forward end of the shoe, a movable shear blade pivotally connected to the forward end of the shoe and cooperating with the fixed blade, a spring arm upon the shoe, a link connected at one end to the forward end portion of the pivoted blade and directly connected at the other end to the free end portion of the spring arm and means upon the handle directly connected to the spring arm for closing the blades.

4. A lawn trimmer including a shoe for engagement with the surface of a lawn, a handle connected to the rear end of the shoe, a fixed shear blade upon the forward end of the shoe, a movable shear blade pivotally connected to the forward end of the shoe and cooperating with the fixed blade, a spring arm fixed at one end upon the pivot, a link connected to the forward end portion of the pivoted blade and directly connected to the spring arm, a flexible member connected to the spring arm and a hand lever upon the handle connected to the flexible member.

5. A lawn trimmer including a shoe for engagement with the surface of a lawn, a handle connected to the rear end of the shoe, a fixed shear blade upon the forward end of the shoe, a movable shear blade pivotally connected to the forward end of the shoe and cooperating with the fixed blade, a link connected at one end to the forward end portion of the pivoted blade, a spring arm directly connected at its free end to the other end of said link, means upon the handle, connected to said spring arm, for manipulating the movable shear blade and means upon the shoe for limiting the opening and closing movement of the pivoted blade.

In testimony that I claim the above, I have hereunto subscribed my name.

AUGUST HUBERTY.